H. FÖTTINGER.
MIXED GAS AND LIQUID TURBINE.
APPLICATION FILED NOV. 13, 1914.

1,256,673.

Patented Feb. 19, 1918.
4 SHEETS—SHEET 1.

Witnesses

Inventor
Hermann Föttinger
By Sowell & Sowell
Attorneys

H. FÖTTINGER.
MIXED GAS AND LIQUID TURBINE.
APPLICATION FILED NOV. 13, 1914.

1,256,673.

Patented Feb. 19, 1918.
4 SHEETS—SHEET 2.

H. FÖTTINGER.
MIXED GAS AND LIQUID TURBINE.
APPLICATION FILED NOV. 13, 1914.

1,256,673.

Patented Feb. 19, 1918.
4 SHEETS—SHEET 3.

Witnesses
C. L. Thornton
W. Wallace Nairn Jr

Inventor
Hermann Föttinger
By Dowell & Dowell
Attorneys

H. FÖTTINGER.
MIXED GAS AND LIQUID TURBINE.
APPLICATION FILED NOV. 13, 1914.
1,256,673.  
Patented Feb. 19, 1918.  
4 SHEETS—SHEET 4.
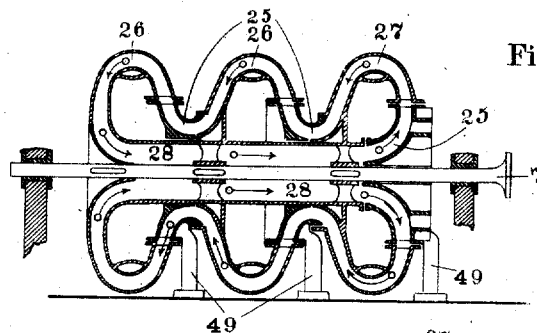
Fig. 7
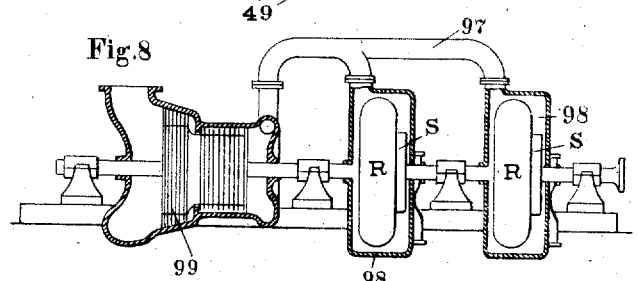
Fig. 8
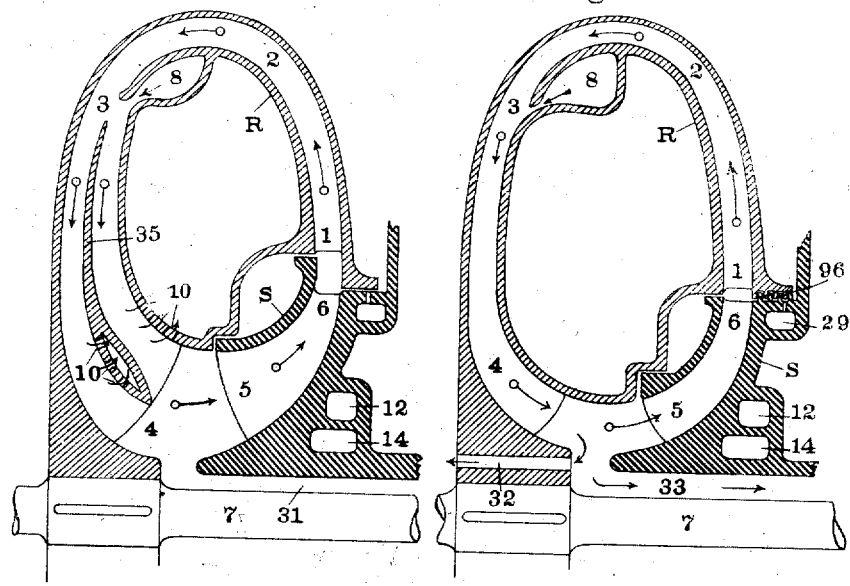
Fig. 9   Fig. 10
Witnesses  
Fig. 11a
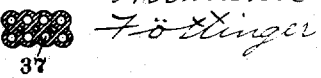  
Fig. 11b Inventor  
Hermann Föttinger  
By Dowell & Dowell  
Attorneys

UNITED STATES PATENT OFFICE.

HERMANN FÖTTINGER, OF ZOPPOT, NEAR DANZIG, GERMANY.

MIXED GAS AND LIQUID TURBINE.

1,256,673.

Specification of Letters Patent.

Patented Feb. 19, 1918.

Application filed November 13, 1914. Serial No. 871,981.

*To all whom it may concern:*

Be it known that I, HERMANN FÖTTINGER, a subject of the King of Bavaria, residing at No. 13 Baedeckerweg, Zoppot, near Danzig, in Germany, have invented new and useful Improvements in Mixed Gas and Liquid Turbines, of which the following is a specification.

This invention relates to improvements in turbines in which compressed air or other fluid is used as the driving means, the said fluid being mixed with an auxiliary liquid continually circulating in a circuit formed by stationary and rotary parts of the engine. This auxiliary liquid is energized by the driving fluid and transmits the impulse received to the turbine. The object of this invention is to provide a turbine in which the kinetic energy of the driving fluid is directly utilized by producing a mixture of the fluid and the auxiliary liquid, capable of acting on the rotary part of the turbine by its expansion.

This object is attained by admitting the driving fluid to the circulating auxiliary liquid at a place of high pressure in the rotary part of the circuit with nearly the same velocity and conveniently in the same direction, permitting the mixture to gradually expand during its flowing to a place of lower pressure of the circuit, where the driving fluid will be separated from the auxiliary liquid and exhausted.

Another object of the invention is to generate the high pressure of the auxiliary liquid in the turbine itself by giving one branch of the circuit the construction of a centrifugal pump.

Further objects of the invention are to provide means for exhausting and admitting liquid to and from the circuit for cooling purposes, continuous channels being formed in the rotary and stationary members conjointly, the channel in the stationary member being so arranged as to give the auxiliary liquid circulating therein a driving impulse against the rotating member when delivered thereto.

The principle on which the operation of the turbine takes place is as follows: The auxiliary liquid entering the one branch of the rotary turbine-wheel and flowing outward therein will be put under pressure. Near the outer end of the second branch of the circuit the driving fluid admitted under high pressure enters the liquid in the shape of bubbles, thereby forming a mixture which flows inward and gradually expands in the said second branch, whereby the liquid will transmit to the turbine-wheel the energy received from the driving fluid.

In the drawing, which forms a part of this specification a number of constructions being embodiments of the invention, are illustrated by way of examples.

Figure 3A:
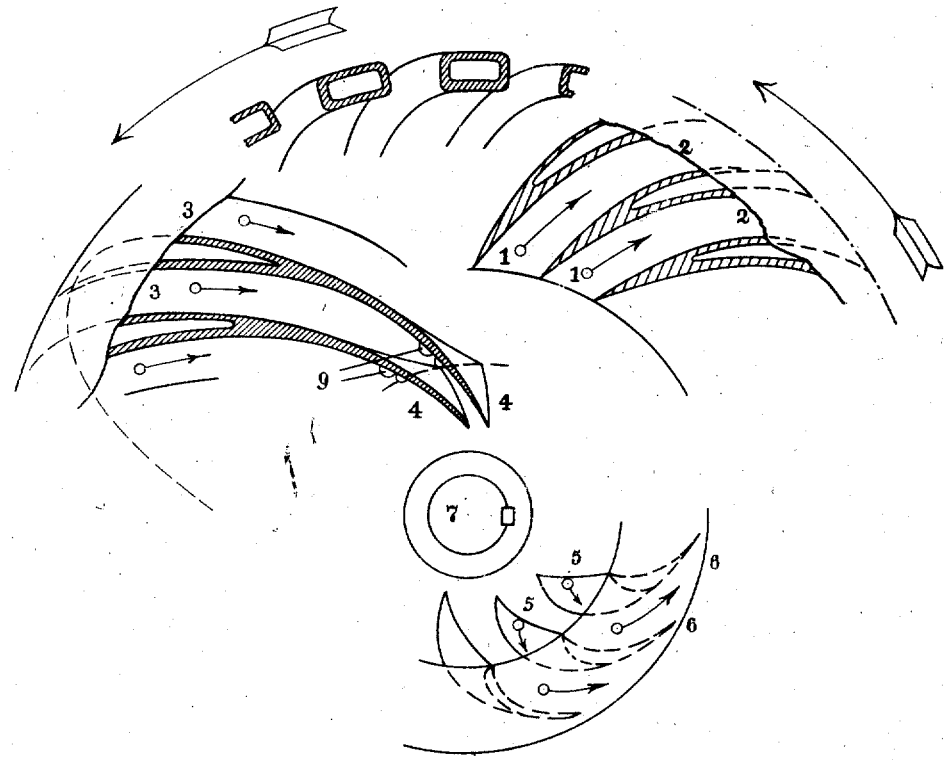
Figure 3B:
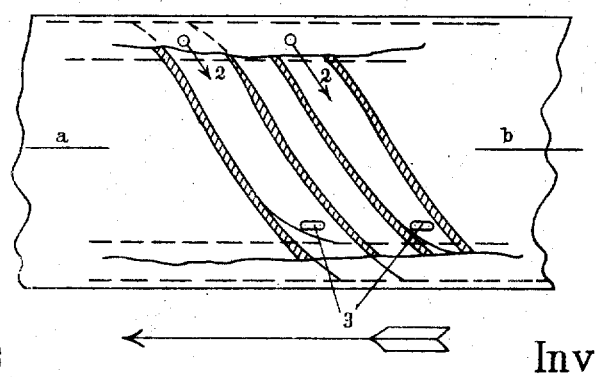

Fig. 3$^a$ represents diagrammatic sectional and side elevations of different parts of the circuit.

Fig. 3$^b$ is a longitudinal sectional view of the peripheral part of the circuit.

Figure 4:
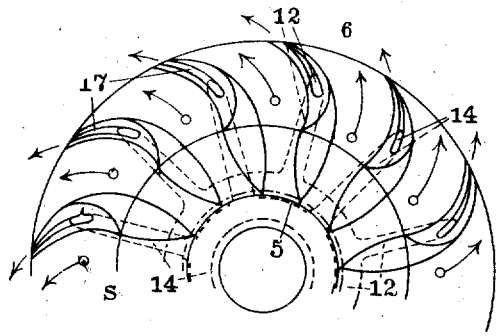

Fig. 4 is a diagrammatic side elevation of the guide-wheel of the turbine.

Figure 5:
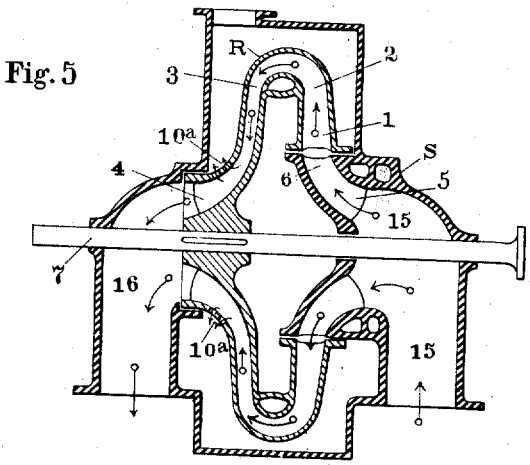

Fig. 5 is a vertical sectional view of a modification of the circuit of the turbine.

Figure 6:
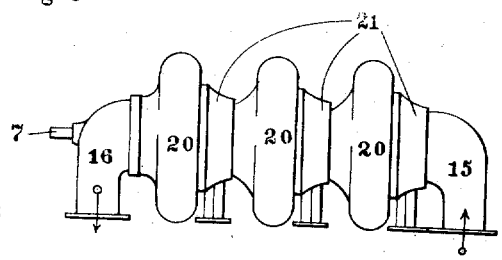

Fig. 6 is a side elevation of a multiple combination thereof.

Fig. 7 represents a diagrammatic sectional elevation of a multiple turbine with a closed circuit.

Fig. 8 is a sectional view of a combination of the turbine according to the invention with a low pressure turbine.

Figs. 9 and 10 are partial sectional elevations of two further modifications of the circuit.

Figs. 11$^a$ and 11$^b$ represent cross sections of a channel of the circuit in two different modifications.

Like numerals denote like parts throughout all figures of the drawings.

Figure 1:
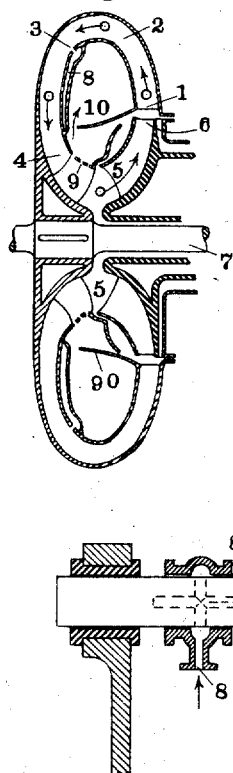
Figure 1 is a diagrammatic illustration of a circuit disposed according to the invention.

In order to explain the principle and the operation of the new turbine, reference is first had to the diagrammatic Fig. 1 which represents as an example an axial plane of the circuit of a turbine constructed and working according to the invention. 1—2—3—4 denote, as fastened to the shaft 7, a rotor of the turbine type, which surrounds a stationary guide-apparatus 5—6. The rotating part 1—4 and the guide wheel 5—6 provided with channels as well known in turbines constitute a closed circuit in the shape of a hollow or vortex-ring in which the liquid constantly circulates through 1—2—3—4—5—6—1 in the direction of the arrows marked therein. 8 denotes a supply duct for the compressed air which at the point 3 is forced into the stream of the auxiliary liquid and distributed therein in the shape of small bubbles.

Supposing the rotating part 1—4 and the guide-wheel 5—6 are filled with the liquid and the rotor be set in a quick rotation, owing to the effect of the centrifugal force the liquid will then be in the channels 2 to 3 at a high pressure which decreases gradually in the direction of 2 to 1 and 3 to 4. The auxiliary liquid will therefore carry the bubbles of compressed air toward 4 to the region of low pressure, whereby the bubbles will expand considerably and increase their volume many times. The result of this is that the total volume (liquid and expanded air) which every second reaches the point 4, is considerably larger than the volume near the point 3 (liquid and compressed air); therefore, the average velocity of the stream from 3 to 4 must increase according as more air is supplied at the place 3. The bubbles of compressed air assume the corresponding pressure of the liquid at each place between the points 3 and 4 and transmit work to the liquid by expansion and pressure owing to their increase of volume and the pressure with which the air is admitted. This work has the effect to push the liquid through the channels of the turbine- and guide-wheels in the above-disclosed direction. The energized liquid on its part transmits work to the turbine-wheel and therefore to the shaft, principally when flowing in the way from 3 to 4. The bubbles of air, after having relinquished the power to the liquid, are exhausted in a region of low pressure near the center on a smaller radius through the openings 9 and escape into the atmosphere or may be utilized in another turbine of suitable construction or other device.

The essential feature of the operation resides in the fact that the compressed air supplied to the rotating turbine wheel with a constant pressure is mixed with a continually flowing liquid with a moderate velocity, whereupon it is carried with the auxiliary liquid through the channels of the circuit, thereby expanding and doing work, the expanded air being finally exhausted.

The compressed air does not require to get a high velocity, but is mixed with the stream of the auxiliary liquid with about the same velocity. The said mixing is not comparable with a jet of air saturated with liquid as in an injector; on the contrary the driving fluid is distributed in the liquid as bubbles. This operation renders it possible to utilize the expansion-power of gases even at a pressure of 100 atmospheres and with comparatively small peripheral velocities (150-160 m/sec.) in a single rotor. With a view of reduction of losses, it is an important fact that the point, at which the air-bubbles are mixed with the liquid is located in the rotating turbine-wheel itself.

Figure 2:
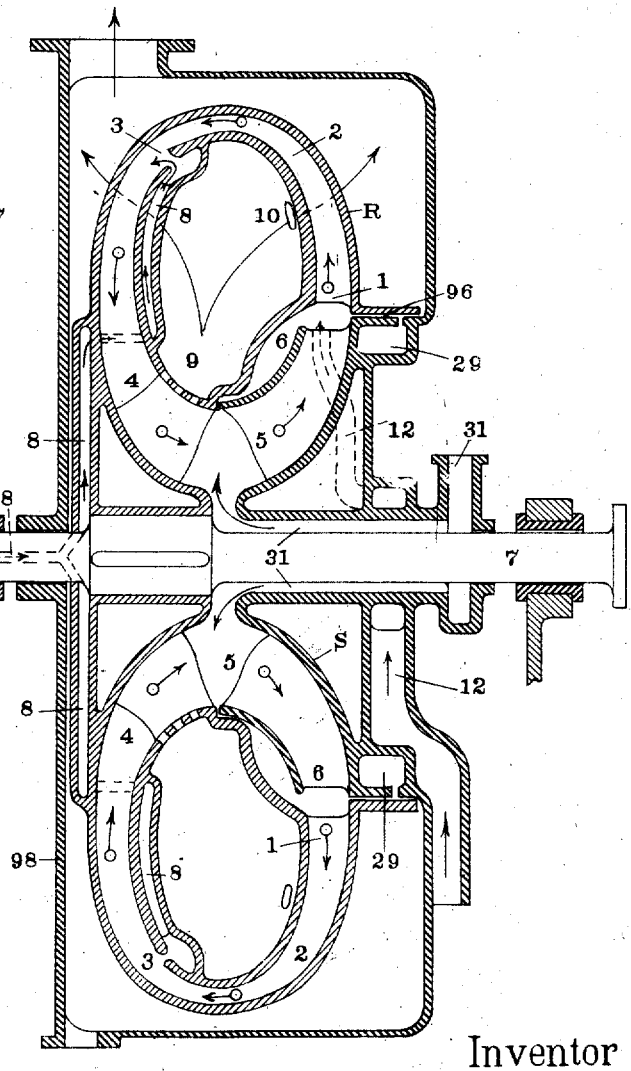
Fig. 2 is a vertical sectional elevation of a turbine composed of stationary and rotary parts.

In Fig. 2 which represents the constructional arrangement of a turbine according to the invention, R denotes the rotary turbine-wheel, and S the stationary guide-wheel integral with a cast casing inclosing the entire engine. The turbine-wheel mounted upon a shaft 7 has a double wall with curved vanes and channels therebetween which extend in the direction 1—2—3—4, while the similarly constructed channels 5—6 of the guide-wheel S complete the elliptical circuit in the form of a hollow or curling ring. Instead of oval, the circuit may be of any other form. The liquid leaving the turbine-wheel at the point 4, passes into the guide wheel from where it is directly reconducted to the turbine wheel at the point 1 with a suitable velocity and convenient direction. This secures the advantage of the least losses of energy and of a very compact construction without pipes for admission and exhaust of the main stream of liquid.

At the left of Fig. 3$^a$ the vanes of the inward-leading branch 3 to 4, and at right those of the outward-leading branch 1 to 2 of the turbine wheel are shown in section perpendicular to the axle, while above in the middle a transverse section, on the line $a$—$b$ of Fig. 3$^b$, of the channels extending from 2 to 3 is represented; below the vanes of the guide-wheel are represented in a perspective view. Fig. 3$^b$ is a longitudinal section of the channels of the turbine-wheel between the points 2 and 3. Fig. 4 is a further perspective view of a modification of the guide-wheel. These figures represent examples of embodiments, however the vanes may have any other curvature, as the case may require. The channels of the turbine and guide-wheels may have a convenient curvature, as can be understood from the views in Figs. 3$^a$, 3$^b$ and 4. The vanes of the outward-leading branch 1—2 represented at right hand of Fig. 3$^a$ are, for example, curved backward with respect to the rotation of the wheel and will put under pressure the liquid circulating in the channels. The inward-leading branch 3—4 of greater radial length has the curvature shown at the left hand of the same figure. The outer ends of the said branches are united by the channels shown in the middle of Fig. 3$^a$ and Fig. 3$^b$. The curved channels in the guide member 5—6, illustrated in lower portion of Fig. 3$^a$, and in Fig. 4, will give the liquid a direction required for the best admission to the turbine-wheel at the point 1. It will be observed from the detailed views, that the circuit is composed of radially outward and inward leading channels connected by outer and inner channels which may be axial or oblique with respect to the axis.

The turbine-wheel may be made either as a smooth hollow cast body (Fig. 2) in which walls or vanes for the formation of channels are cast, or the inner part alone can be built as a hollow-cast body, while the outer radiating channels of any convenient cross-section (Figs. 3ª and 3ᵇ) can be cast therewith or attached thereto by screws, wedges or the like, either singly or in groups. In order that the losses by ventilation shall not be too high, a smooth thin covering (Figs. 3ª, 3ᵇ) can be mounted to encircle the turbine-wheel; slits 10 being provided directly in the cast wheel or in the covering to permit the escape of the exhausted gases to the atmosphere.

At any places of the circuit the channels can be subdivided by lengthwise arranged partitions 35 (Fig. 9) into two or more parallel channels, in order to better conduct the current, where the gases have a very considerable volume. The division of the channels into a certain number of channels 36 and 37 of small width and convenient cross-section is illustrated in Figs. 11ª and 11ᵇ. The object of this construction is the guiding of the bubbles which are separated the one from the other in the small pipes by water-plungers. Thus, the mixture is certainly maintained.

The admission of the compressed air to the circuit takes place near the point 3, where the air arrives through a convenient duct, such as 8, at the inner end of which a chamber can be provided opening into each passage of the turbine, as shown in Fig. 2. Preferably the said ports are formed as tubes or nozzles (Fig. 9), in order to facilitate the mixing of the air with the liquid. The admission ports may correspond to the turbine-passages in number and location.

The air exhausted through the ports 9 (Fig. 1) can be led off through slits 10 in the rotary member of the turbine or through the intervals of the single channels of the turbine wheel (Figs. 3ª and 3ᵇ) and be collected in a closed casing 98. The exhaust can however take place at different points. Fig. 9 shows exhaust ports 10 in two groups, opening to the middle of the circuit, while in Figs. 5 and 10 ports 10ª and 32, respectively, are represented which lead outward. As the air inclosed in a liquid always escapes in the direction of the lowest pressure, it is only required to produce a sufficiently high rotation of the liquid near the point 4 by the employment of conveniently constructed vanes, when it is desired to remove the bubbles to a certain point.

As indicated in Fig. 1, inside the turbine-wheel a partition 90 may be mounted to overhang the exhaust-ports, in order to catch the liquid carried with the air, and to reconduct it into the circuit.

With very high pressures of the air and when the entire circuit is put under pressure by known means, it is possible to dismiss the air with a pressure which is still above the atmospheric pressure and to utilize the remaining power in a turbine of any suitable construction. This arrangement is shown in Fig. 8. The air collected in the casings 98 of two turbines of the kind above-described is admitted to a low pressure turbine 99 of a known type by means of pipes 97.

To prevent undue cooling of the auxiliary liquid a small part thereof may be led out off the circuit into a device for heating it, and then introduced again into the circuit. The partial discharge of the liquid may, f. ex., be made through the labyrinth packing 96 into the ring chamber 29 or through the channel 33 (Fig. 10) or 31 (Fig. 9), while for the influx of the liquid channels 31 (Fig. 2) can be provided. Of course, the liquid may be fed at any other place of the circuit, for example, through the channels 12 and 14 of the guide-wheel, see Figs. 2 and 4 respectively.

A combination of three turbines mounted in series is represented in Fig. 7, in which the circuit is constituted by alternating guide-wheels 25 and turbine-wheels 26 and 27, a tube 28 in the center uniting the ends of the two outer turbines. The driving fluid may be admitted through the standards 49 to every set or only to the first turbine, and exhaust ports disposed at suitable points of the circuit.

It is further possible to use a circuit which is U-shaped in cross-section, as illustrated in Fig. 5, whereby the liquid enters through the admission tube 15 and is discharged through the exhaust tube 16 after its passage in the circuit; the outer ends of the said tubes can be united in any convenient way to close the circuit. In this construction the separation of the air can be effected in the tube 16. Fig. 6 illustrates a combination of this kind composed of three turbine-wheels 20 and three guide-wheels 21, similar to Fig. 7, the tubes 15 and 16 being disposed at the ends of the series.

Compressed air is preferred as driving fluid, but any suitable gas or superheated steam can be used under certain conditions. In this case a liquid should be employed the absorption of heat of which is inferior to that of water. The transmission of heat from superheated gases to the liquid will be comparatively small, as owing to the velocity of the circulation the expansion of the gas from the initial temperature to that of the liquid will occur rapidly.

An intermittent admission or exhaust of the driving fluid may take place, for the purpose of producing a pulsatory operation which will have a certain influence on the dimension and the movement of the bubbles.

As the auxiliary liquid preferably liquids with high specific weight, low coefficient of heat-absorption and small internal friction are employed. High pressures of the circuit are attained with the use of organic fluids, such as tetrabromacetylene, or with quicksilver. In connection with superheated steam as driving fluid low transmission of heat and a high boiling point of the liquid is desirable. In many cases the liquid is employed in hot condition and so maintained by the hot driving fluid.

The engine can be started by the admission of air or liquid under high pressure, until the turbine-wheel attains the required number of revolutions, or the turbine-wheel or the guide-wheel may be rotated directly in a convenient direction, so that the circulation of the auxiliary liquid is caused.

At any place of the circuit means can be inserted for regulating the velocity, the pressure, or the passing quantity of the liquid, or the output or number of revolutions of the turbine. Such means, f: ex., oscillatory vanes or circular slides which may be movable axially or radially, or the like, can preferably be arranged in the stationary guide-wheel between the points 6 and 1. Governing of the operation can also be effected by throttling or increasing the pressure of the driving fluid.

In consequence of the particular operation the dimensions of the turbine can be comparatively small even with low numbers of revolution, and owing to the high centrifugal force of the liquid a considerable initial pressure of the compressed air is applicable at the admission-place with moderate speed of rotation of the turbine.

The engine above-described can also be employed as a generator of liquid under high pressure; in this case part of the auxiliary liquid is discharged and collected in an accumulator or utilized directly. In this case the turbine acts as a pump driven by compressed air. The liquid leaving the turbine with high velocity can also be employed for propelling ships according to the reaction principle. These effects may be obtained alone or besides the creation of work by the turbine.

The guide-wheel 5 to 6 may be arranged rotary in opposite directions, instead of stationary, as known in steam-turbines with oppositely rotating vane-wheels.

While the compressed air works in the branch 3—4, any other fluid or gas can be compressed in the other branch 1—2 and led off in a suitable manner. This direct connection of a turbine and a compressor has the result of a high mechanical efficiency in the appliance.

The driving fluid may be heated before admission, but if the heating is preferred in the turbine itself, together with compressed air a given quantity of gas is admitted and the mixture burned in a combustion-chamber provided upon the turbine-wheel, thereafter the product of the combustion acts as a driving gaseous medium (see channels 12, 14, 17).

In the accompanying drawings several embodiments of the invention have been shown as examples, but it is obvious that many modifications can be performed without departing from the principle of the invention. What I, therefore, broadly claim as my invention, and desire to secure by Letters Patent, is—

1. In a turbine supplied with a gaseous compressed driving fluid, the combination with a guide-wheel, of a turbine-wheel rotary relatively thereto, a supply for the driving fluid leading directly into the turbine-wheel, and an auxiliary liquid circulating in the said guide- and turbine-wheels.

2. In a turbine for the purposes described, the combination with a guide-wheel, of a turbine-wheel rotary relatively thereto, an auxiliary liquid circulating in the said guide- and turbine-wheels, a supply for the driving fluid rotating with, and opening directly into the turbine-wheel near the place of the highest pressure of the auxiliary liquid, and an exhaust for the expanded fluid at a place of low pressure.

3. In a turbine for the purposes described, the combination with a stationary guide-wheel, of a rotary turbine-wheel, an auxiliary liquid circulating in said guide- and turbine-wheels, a supply for the driving fluid rotating with and opening directly into the turbine-wheel near its periphery, and an exhaust for the expanded fluid near the center of the turbine.

4. In a turbine for the purposes described, the combination with a guide-wheel, of a turbine-wheel rotary relatively thereto, the said wheels constituting a closed circuit, an auxiliary liquid circulating in said circuit, a supply for the driving fluid formed upon, and opening directly into the turbine-wheel, and an exhaust for the expanded fluid.

5. In a turbine for the purposes described, the combination with a guide-wheel, of a turbine-wheel rotary relatively thereto, an auxiliary liquid circulating in said guide- and turbine-wheels, a supply for the driving fluid, an exhaust for the expanded fluid, and discharge and admission ducts for part of the liquid for heat-regulating purposes.

6. In a turbine for the purposes described, the combination with a guide-wheel, of a turbine-wheel rotary relatively thereto, the said wheels comprising a closed circuit in the shape of a hollow ring, an auxiliary liquid circulating in said circuit, a supply for the driving fluid, and an exhaust for the expanded fluid.

7. In a turbine for the purposes described, the combination with a guide-wheel, of a turbine-wheel rotary relatively thereto, an auxiliary liquid circulating in said guide- and turbine-wheels, a supply for the driving fluid opening directly into the turbine-wheel in the form of a nozzle adapted to distribute the fluid as bubbles, and an exhaust for the expanded fluid.

8. In a turbine for the purposes described, the combination with a guide-wheel, of a turbine-wheel rotary relatively thereto, the said turbine-wheel comprising an outward leading branch adapted to act as a centrifugal pump and an inward leading branch capable of receiving the driving impulse, an auxiliary liquid circulating in said guide- and turbine-wheels, a supply for the driving fluid opening directly into the turbine-wheel between the said outward and inward leading branches, and an exhaust for the expanded fluid.

9. In a gas-turbine, the combination with a stationary guide member, of a rotary turbine-wheel, said wheel and member being channeled to form a continuous closed circuit together with means for supplying and exhausting a driving medium to and from the channels of said elements.

10. In a gas-turbine, the combination with a stationary guide member, of a rotary turbine-wheel, said wheel and member being channeled to form a continuous closed circuit, and an auxiliary fluid circulating in said circuit together with means for supplying and exhausting a driving medium to and from the channels of said elements.

11. In a gas-turbine, the combination with a rotary turbine-wheel of a stationary guide member, said wheel and member having turbine channels forming a continuous circuit together with means for supplying and exhausting a driving medium to and from the channels of said elements, substantially as described.

12. In a gas-turbine, the combination of a rotary turbine-wheel having a branch adapted to compress the driving medium together with means for supplying and exhausting a driving medium to and from the channels of said elements.

13. In a gas-turbine, a rotary turbine-wheel having a branch adapted to compress the driving medium and a branch adapted to receive the driving impulse.

14. In a gas-turbine, the combination of a rotary channeled turbine-wheel, a channeled guide member, the channels of the wheel and member, forming a continuous circuit, an auxiliary fluid traversing said circuit, and means for exhausting and admitting part of said fluid from and to said circuit for cooling purposes.

15. In a gas-turbine, the combination with a stationary guide member, of a rotary turbine-wheel surrounding said guide member and having ports therein for the admission of compressed air, said wheel and member being channeled to form a continuous closed circuit, and an auxiliary fluid circulating in said circuit.

16. In a gas-turbine, the combination with a rotary turbine-wheel of a stationary guide member within and encircled by said wheel, said wheel and member having turbine channels forming a continuous circuit, an auxiliary fluid circulating in said circuit, and inlet and outlet passages to said circuit for the driving medium, substantially as described.

17. In a gas-turbine, the combination of a rotary turbine-wheel having a branch adapted to compress the driving medium and a branch adapted to receive the driving impulse, and an auxiliary driving fluid circulating in said branches.

18. In a gas-turbine, the combination of a rotary channeled turbine-wheel, a channeled guide member, the channels of the wheel and member forming a continuous circuit, and an auxiliary fluid traversing said circuit together with means for supplying and exhausting a driving medium to and from the channels of said elements.

In testimony whereof I have signed my name to this specification in the presence of two subscribing witnesses.

HERMANN FÖTTINGER.

Witnesses:
 FRANCIS R. STEWART,
 LOUIS F. DILGER.